United States Patent
Winkler

(10) Patent No.: US 10,524,449 B2
(45) Date of Patent: Jan. 7, 2020

(54) PIG RESCUE FEEDER AND WATERER

(71) Applicant: HavWin, LLC, Bern, KS (US)

(72) Inventor: LeRoy E. Winkler, Corning, KS (US)

(73) Assignee: HavWin LLC, Bern, KS (US)

( * ) Notice: Subject to any disclaimer, the term of this patent is extended or adjusted under 35 U.S.C. 154(b) by 204 days.

(21) Appl. No.: 15/896,883

(22) Filed: Feb. 14, 2018

(65) Prior Publication Data

US 2018/0249676 A1  Sep. 6, 2018

Related U.S. Application Data

(60) Provisional application No. 62/467,497, filed on Mar. 6, 2017.

(51) Int. Cl.
| | | |
|---|---|---|
| *A01K 5/01* | (2006.01) | |
| *A01K 7/02* | (2006.01) | |
| *A01K 1/02* | (2006.01) | |

(52) U.S. Cl.
CPC .............. *A01K 5/01* (2013.01); *A01K 1/0209* (2013.01); *A01K 7/02* (2013.01)

(58) Field of Classification Search
CPC ...... A01K 5/01; A01K 5/0216; A01K 1/0209; A01K 7/02
See application file for complete search history.

(56) References Cited

U.S. PATENT DOCUMENTS

| | | | |
|---|---|---|---|
| 984,980 A | 2/1911 | Taylor | |
| 4,173,947 A * | 11/1979 | Whiteside, Jr. | A01K 1/0227 119/457 |
| 4,719,875 A * | 1/1988 | Van Gilst | A01K 5/0241 119/53.5 |
| 4,911,727 A * | 3/1990 | King | A01K 5/0216 119/51.5 |
| 6,837,189 B2 | 1/2005 | Schick | |
| 7,549,393 B2 * | 6/2009 | Kleinsasser | A01K 5/0225 119/51.5 |
| 2015/0083048 A1 * | 3/2015 | McAdams | A01K 7/06 119/51.5 |
| 2016/0073609 A1 * | 3/2016 | Kleinsasser | A01K 5/01 119/51.5 |

OTHER PUBLICATIONS

HogSlat.com, Nipple Bar, 2017, http://www.hogslat.com/nipple-bar-with-8-nursery-nipples-4.

* cited by examiner

*Primary Examiner* — Monica L Williams
(74) *Attorney, Agent, or Firm* — Daniel J. Coughlin; Coughlin Law Office LLC

(57) ABSTRACT

A feeder and watering apparatus for pigs and a method for rehabilitating a fallback pig and preventing the fallback of a weaned pig is disclosed. A pair of semi-cylindrical troughs are mounted to either side of a fluid supply line. The troughs have a rooting protector mounted to the open portion of the trough, the rooting protector has a pair of longitudinally extending bars and multiple rung portions that are longitudinally spaced apart to provide a plurality of discrete eating areas. The troughs have a front wall portion that is lower than the rear wall portion to prevent feed from spilling over the rear wall. Multiple waterer nipples extend horizontally through holes in the rear wall. A quick-connect floor mount is rotatably mounted to the fluid supply line, with a handle that allows a retaining portion to lock the apparatus in cooperation with floor slats.

12 Claims, 4 Drawing Sheets

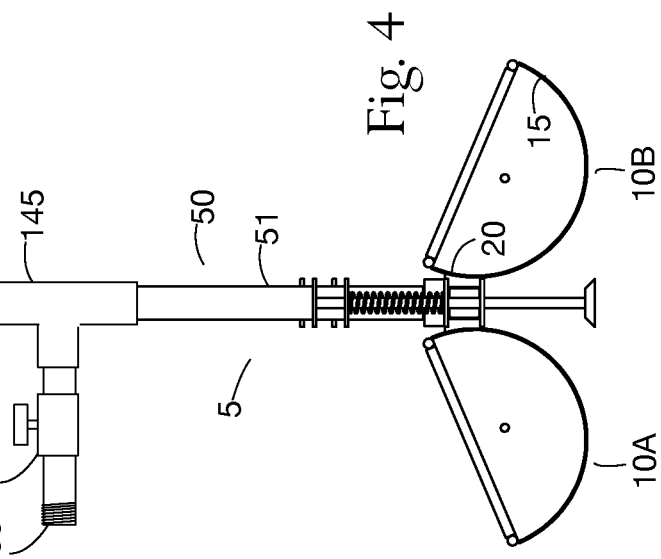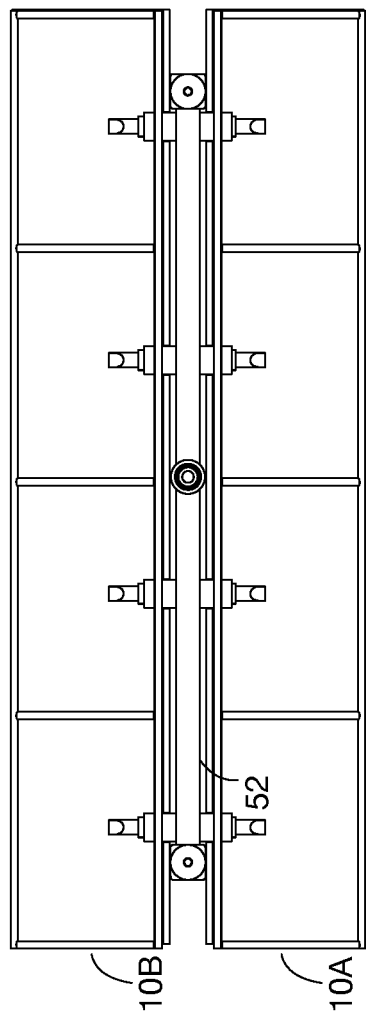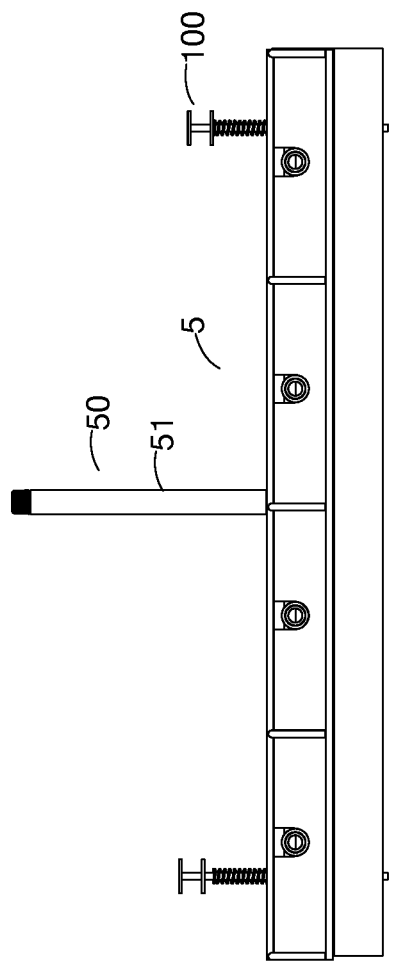

PIG RESCUE FEEDER AND WATERER

CROSS REFERENCES

This application claims the benefit of U.S. Provisional Application No. 62/467,497, filed on 6 Mar. 2017.

REFERENCE TO CDS

Not Applicable.

FIELD OF THE INVENTION

The present disclosure relates to feeding devices for livestock. Particularly, for a portable pig rescue feeder and waterer for temporary use in a fallback pen for rehabilitating fallback pigs.

BACKGROUND

In pig operations, fallback or disadvantaged pigs are pigs that perform poorly compared to their pig counterparts. These sub-standard pigs need special attention, isolation, and a high-quality diet in order to gain performance to reintegrate with the standard pigs. These rescue pigs are identified based on weight, age, appearance and health status relative to the other pigs. Alternative management of the fallback pigs is expensive. It's important to the producer that the disadvantaged pigs catch up to the standard pigs in quickest timeframe possible.

SUMMARY

I created a pig rescue feeder and waterer that allows the fallback pigs to be fed a high quality diet with minimal waste that minimizes the overhead cost of bringing a fallback pig back with the standard pigs. This innovation also facilitates wetting of the feed by positioning the watering nipples above the feed trough.

Another advantage of this technology is the ease of operation for the fallback pigs. In order to operate this rescue feeder and waterer, the fallback pig only needs to operate the water nipple. A producer deposits high quality—and expensive—feed into the trough. When the fallback pig drinks from the waterer nipple, excess water falls into the trough. This excess water wets the feed, making it more palatable for the fallback pig. The pig does not have to operate a feed dispensing mechanism in order to fill the trough with feed. By increasing the palatability and ease of access to the feed, fallback pigs may increase their weight gain and decrease the amount of time to recovery. Another advantage of the pig rescue feeder and waterer is the elimination of the need for the producer to manually mix the highly fortified feed with water. Rather, the fallback pig mixes the water and feed together itself.

Another advantage is the pig rescue feeder and waterer can be quickly installed in a fallback pen and connected to an available water supply. The rescue feeder is lightweight, incorporating non-metallic portions in areas that are protected from being destroyed by the pigs. Metal framing elements provide sufficient structure and protection for the non-metallic components. The minimal usage of metallic components allows a producer to easily move the rescue feeder between pens. The metallic components provide additional structure, which may be advantageous for its durability and the ability to be disinfected. The rescue feeder also incorporates a quick connect water supply connection. The quick connect water supply connection allows the device to be quickly installed in a fallback pen and then easily removed or moved to another pen once the pigs have recovered.

In order to quickly install the rescue feeder, I incorporated a quick connect floor mount. The quick connect floor mount uses a T-shaped or J-shaped bar to connect to the concrete floor slats of a wean-to-finish barn or plastic nursery flooring. The quick-connect floor mount has shaft, a handle portion that extends horizontally from a top portion of the shaft, and a restraining portion that extends horizontally from a lower portion of the shaft. The length of shaft depends on the application, with the shaft being longer for use with concrete floor slats commonly used in a wean-to-finish barn. The shaft would be shorter for use with plastic nursery flooring. The quick-connect floor mount has a spring or other biasing member that encourages the floor mount upward. The producer pushes the quick-connect floor mount downward, such that the retaining portion goes through the floor slats. Then the producer turns the quick-connect floor mount such that the lower retaining portion is caught on the underside of the flooring. The spring or other biasing member pushes the whole floor mount upward, with the retaining portion engaged with the underside of the flooring, thereby quickly securing the rescue feeder in place.

I also recognized that fallback pigs need to adjust to a social eating environment. The technology provides the fallback pigs the benefit of (1) access to the dedicated feed and water area and (2) a clear line of sight between opposing feeding troughs to overcome any isolation tendencies that the fallback pigs might have. Increasing fallback pig socialization by incorporating a clear line of sight between the first trough and the second trough helps the fallback pigs prepare for reintegration into a wean-to-finish barn.

It is understood that other embodiments will become readily apparent to those skilled in the art from the above detailed description, wherein various embodiments are shown and described by way of illustration only. As will be realized, the concepts are capable of other and different embodiments and their several details are capable of modification in various other respects, all without departing from the spirit and scope of what is claimed as the invention. Accordingly, the drawings and detailed description are to be regarded as illustrative in nature and not as restrictive.

BRIEF DESCRIPTION OF DRAWINGS

Aspects are illustrated by way of example, and not by way of limitation, in the accompanying drawings, wherein:

FIG. 2 shows a top view of a pig rescue feeder and waterer;

FIG. 3 shows a first side view of a pig rescue feeder and waterer;

FIG. 4 shows a second side view of a pig rescue feeder and waterer;

DETAILED DESCRIPTION

Figure 1:
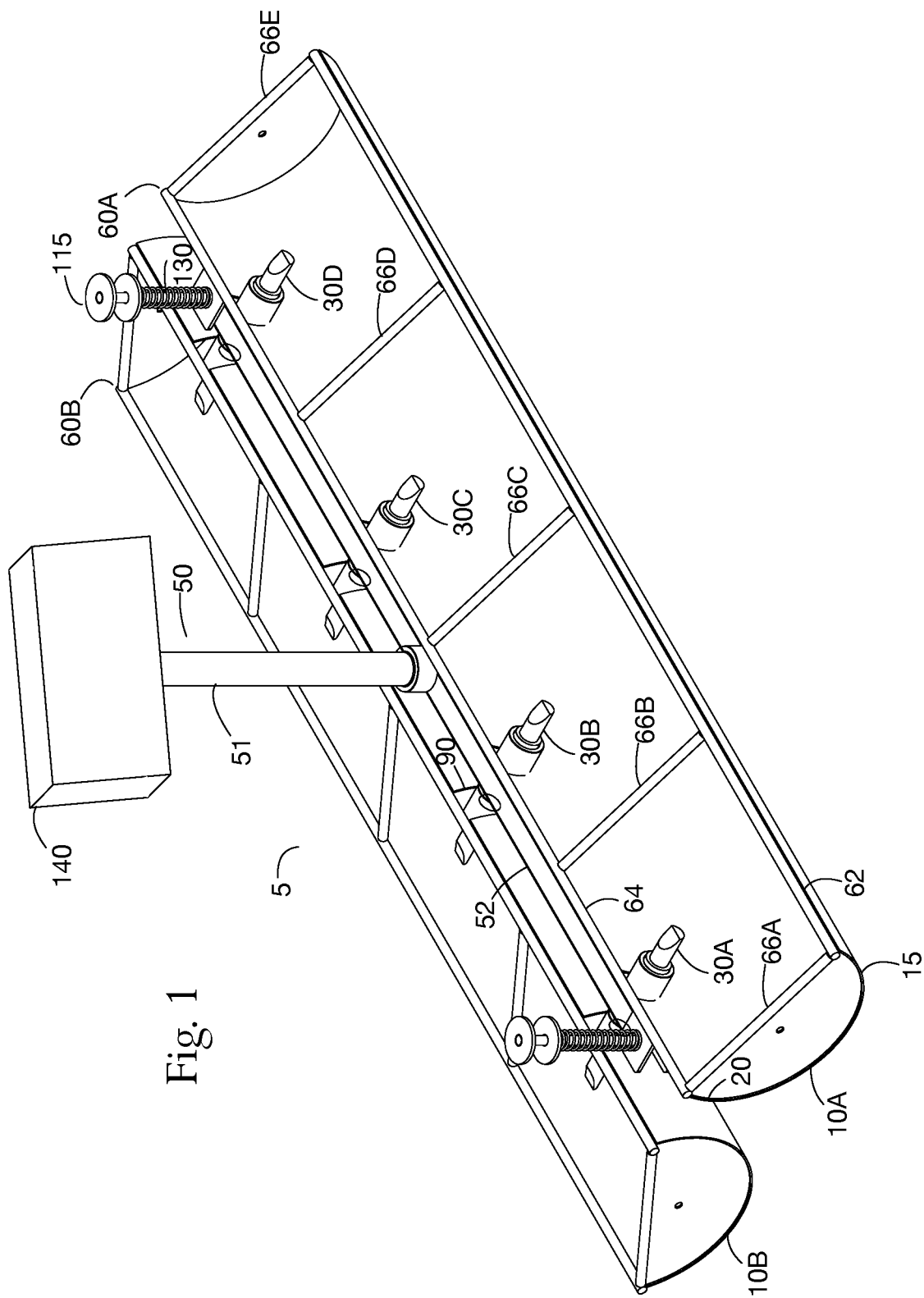
FIG. 1 shows a top perspective view of a pig rescue feeder and waterer connected to a water reservoir tank.
Figure 5:
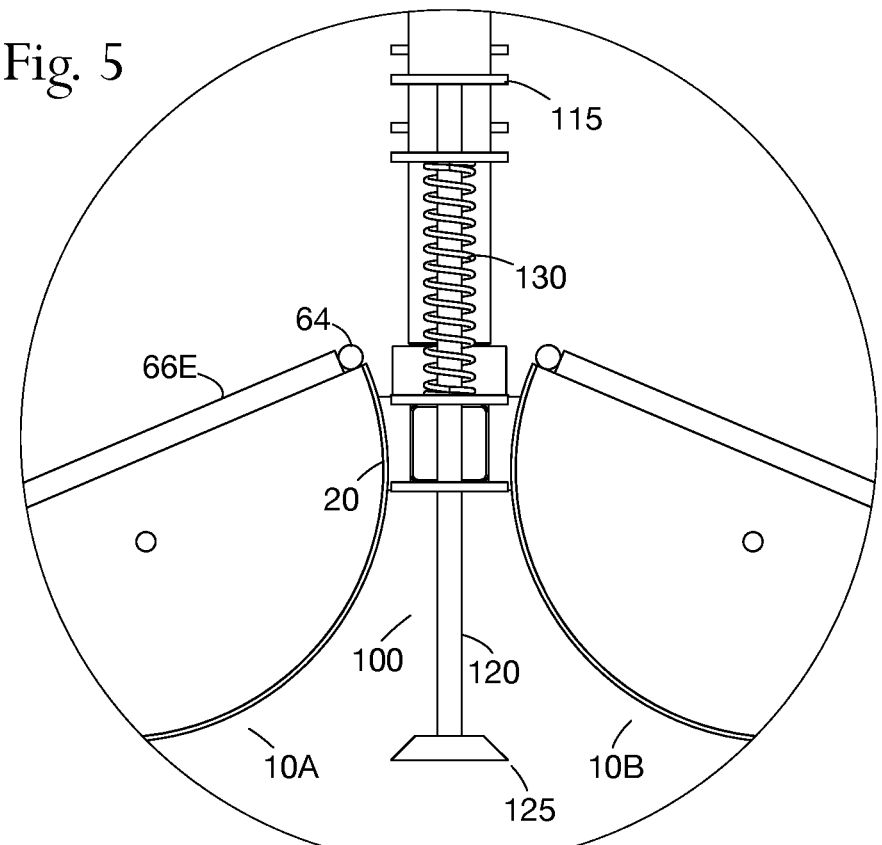
FIG. 5 shows a partial enlarged side view of a pig rescue feeder and waterer, highlighting the quick-connect floor mount.
Figure 6:
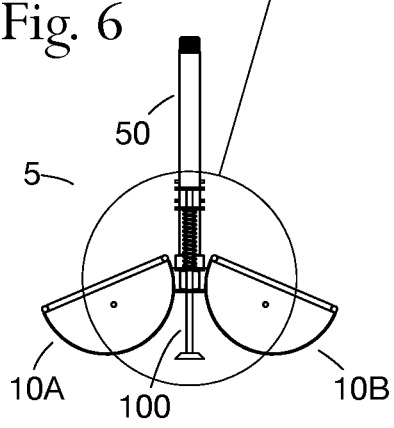
FIG. 6 shows a second side view of a pig rescue feeder and waterer.

The present innovation provides a pig rescue feeder and waterer 5 that has the following advantages:

a) easily moved from one pen to another;
b) able to be quickly secured in place;
c) easy access to palatable, wetted food without requiring mechanical activation of a feed hopper; and
d) provides fallback pigs with a defined trough portion and water nipple 30 with a clear line of sight to other pigs in the pen.

In one aspect, the rescue feeder has a pair of troughs 10 that are opposing to one another and semi-cylindrical in shape. These troughs 10 allow the producer to deposit food for the fallback pigs to consume. In the illustrated embodiment, the troughs 10 longitudinally extend along the length of the rescue feeder. The troughs 10 may be made of stainless steel or a non-metallic substance, such as polyvinyl chloride (PVC). When made of PVC, the trough may be made from a PVC pipe that has been divided in half along the length of the pipe. A first half of the pipe can be used to provide the first trough 10A and the second half pipe can provide the second trough 10B.

The troughs 10 are mounted at an angle, with a front wall 15 comprising a lower portion facing toward a pig that is eating from the trough. The trough has a rear portion that is raised and faces the opposing trough. In this orientation, the amount of the highly fortified feed wasted is minimized as the back wall 20—from the eating pig's perspective—is higher than the front wall 15. As the pig's snout contacts the rooting bar, described below, the pig stops pushing the feed upward. As the pig roots around in the feed, the orientation of the front wall 15 to the back wall 20 causes the feed to fall back into the trough.

A water nipple 30 is provided through the raised back wall 20 of each trough. The raised back wall 20 of the first trough 10A has a nipple hole 90 through which the water nipple 30 can be inserted and threadably received into a water supply line. The water nipple 30 includes an activating pin that allows water to flow from the water supply line. The fallback pig pushes or bites on the activating pin to start the water flow. As pigs are notoriously sloppy with eating and drinking, a portion of the water that is released from the water nipple 30 falls into the trough. The water nipple 30 extends horizontally through the respective nipple hole 90 in the back wall 20 of the trough 10A,B.

Wet feed is more palatable to pigs than dry feed. When using standard rubber pans to feed the fallback pigs, the producer must manually wet and mix the highly fortified feed. By inserting the water nipple 30 through the back wall 20 of the trough, any excess water dispensed from the water nipple 30 falls into the first trough 10A or the second trough 10B. By receiving the water nipple 30 through the trough, the water supply line 50 provides structural support for the respective trough.

Rooting protectors 60 may cover the tops of the first trough 10A and the second trough 10B to prevent damage from the fallback pigs rooting with their snouts against the trough. The rooting protectors may comprise welded metal rods that are secured to the first trough 10A and second trough 10B with appropriate fasteners. In the illustrated embodiment, the rooting protectors 60 are configured in a ladder-like structure. The rooting protectors are comprised of a ¼" to ¾" round metal rods, such as ⅜" round metal rods, that are welded together. A first bar 62 extends along the top front portion of the trough. A second bar 64 extends along the top rear portion of the trough. Smaller bars make up the ladder rungs 66A-E, extending between the first bar 62 and the second bar 64 along the longitudinal length of the first trough 10A and the second trough 10B. A first rooting protector 60A having a ladder structure is mounted to the first trough 10A and a second rooting protector 60B having a ladder-like structure is mounted to the second trough 10B. Another advantage of the rooting protectors 60 is to prevent feed wastage. The rooting protectors 60 prevents pigs from rooting the feed over the back wall, as the feed hits the rear portion of the rooting protector 60. The inner rooting protectors also protect the feed from being wasted from lateral rooting, which pushes the feed out of the trough from the lateral side. Another advantage of the rooting protectors 60 is to prevent pigs from laying or sleeping or defecating in the trough.

The rooting protector 60A,B has several longitudinally spaced apart rung portions 66A-E that to provide discrete, defined eating areas for each of the fallback pigs. There are two end rung portions for the first trough 10A and two end rung portions for the second trough 10B. The end rung portions are disposed at the longitudinal end of the first bar 62 and the second bar 64. There are a plurality of inner rung portions that are longitudinally spaced apart between the end rung portions. The plurality of inner rung portions are mounted between the first bar 62 and the second bar 64. The eating areas are defined by a pair of rung portions 66A-E. The inner rung portions separate distinct eating areas. A corresponding water nipple fitting is provided between each of the rung pairs, such that each pig has a discrete eating and drinking area. This limits competition between the fallback pigs, ensuring the already compromised pigs do not have to compete for access to an eating and drinking area.

The rooting protector 60A, B is mounted to the troughs 10 such that the rooting protector also provides structure and structural stability to the troughs 10. In one embodiment, a flange extends downwardly from the rooting protector 60A, B. The flange has a hold in it to receive a fastener that also passes through the back wall 20 of the first trough 10A. A second fastener can also pass through the back wall 20 of the second trough 10B. There are corresponding flanges and corresponding fasteners that secure the first bar 62 to the front wall 15 and secure the second bar 64 to the back wall 20. A bridging portion may join the first rooting protector 60A and the second rooting protector 60B to structurally support the first trough 10A and the second trough 10B. For example, in an embodiment having a trough made of PVC, a bridging portion may be provided. The bridging portion may also be welded to the water supply line at a weld point. In an alternative embodiment, the first trough 10A is made of stainless steel and is mounted directly to the horizontal portion 52 of the water supply line 50. Similarly, the second trough 10B can be made of stainless steel and mounted directly to the horizontal portion 52 of the water supply line 50. Additionally, in embodiments where the trough is made of stainless steel, the rooting protector 60A, B may be mounted—such as by welding—directly to the respective trough. In a hopperless configuration, a feeder not having a feed hopper, each fallback pig at the first trough 10A has a clear line-of-sight to the pigs at the second trough 10B.

A pressurized water supply line 50 is provided between the first trough 10A and the second trough 10B. The pressurized water supply line 50 can be a commercially available nipple bar, such as the stainless steel nipple bar available from Hog Slat. The nipple bar is an L-shaped stainless steel square pipe having appropriate fittings to receive a standard screw-in pig nipple waterer. The nipple holes 90 in the respective trough correspond to the longitudinally spaced nipple fittings in the nipple bar.

In another aspect, the rescue feeder and waterer 5 is equipped with a quick connect floor mount system 100. The quick connect floor mount 100 uses a T-shaped or J-shaped bar to connected to the slats of a concrete floor in a wean-to-finish barn or the corresponding slats in a plastic nursery flooring. The quick-connect floor mount has a top handle portion 115, a lower restraining portion (not shown), and a shaft 120 between the top handle portion 115 and the restraining portion 125. The handle portion 115 extends horizontally from a top portion of the shaft. The restraining portion 125 extends horizontally from a lower portion of the shaft 120. The length of shaft 120 may depend on the application. In one example, the shaft 120 may be longer for use with concrete floor slats commonly used in a wean-to-finish barn. The shaft 120 may be shorter for use with plastic nursery flooring. In another example, the shaft 120 is between 6" to 10". In another example, the shaft 120 is 8" in length. In another example, the shaft 120 extends 5.5" below the trough in the secured position. The lower restraining portion extends horizontally from a lower portion of the shaft 120 and engages with the underside of the floor.

The quick-connect floor mount 100 has a spring or other biasing member 130 that encourages the floor mount upward. The producer pushes the quick-connect floor mount 100 downward, such that the retaining portion goes through the floor slats. Then the producer turns the quick-connect floor mount such that the lower retaining portion is caught on the underside of the flooring. The biasing member 130 pushes the floor mount 100 upward, with the retaining portion engaged with the underside of the flooring, thereby quickly securing the rescue feeder in place. In the illustrated embodiment, the quick-connect floor mount 100 is securely mounted to the bridging portion 85.

As illustrated, there are two longitudinally spaced apart quick-connect floor mounts 100 provided to secure the pig rescue feeder and waterer to the floor of the barn through the floor slat.

As illustrated, the rooting protector 60A,B, troughs 10A, B, water supply line 50, and quick-connect floor mount 100 are securely mounted together. These portions can be secured together by welding the individual components together or by providing appropriate brackets and fasteners. In another embodiment, the rooting protector 60A,B, bridging portion 85, and quick-connect floor mount 100 are secured together using a plurality of fasteners, tabs, and flanges to provide a secure support structure.

The pig rescue feeder and waterer 5 can incorporate a quick attach saddle to provide a pressurized source of fresh water. The quick attach saddle (not shown) mounts to PVC water supply line after drilling a small outlet hole where you would like the hose to hang from. The quick attach saddle can incorporate a shut-off slide to close water supply at the PVC line as needed. An example of a commercially available quick attach saddle is the Hog Slat ¼"×6' Complete Plumbing Kit With Shut Off.

As illustrated in FIG. 1, the pig rescue feeder and waterer also comprises a self-contained water reservoir 140. The water reservoir 140 is fluidly connected to the water supply line 50 at an elevated position. In the elevated position, the water reservoir 140 provides pressurized water to the nipples 30. In this embodiment, the unit is self-contained and does not need to be connected to a pressurized water source. The fluid supply line can also incorporate medicine or feed supplements when connected to a pressurized water source or the water reservoir 140. The water reservoir may be mounted to a vertical portion 51 of the water supply line 50, such as a 12" vertical round or square pipe that has a threaded coupling at both ends. In this way, the water reservoir 140 does not interfere with the clear line of sight for animals stationed at the first trough 10A and at the second trough 10B. In one embodiment, the water reservoir 140 is a 3-gallon reservoir that connects directly to the threaded coupling at the top of the vertical portion 51 of the water supply line 50.

As illustrated in FIG. 4, the pig rescue feeder and waterer may provide plumbing for connecting a water reservoir 140 or a pressurized water source as well as a concentrated medicine or feed supplement supply. The plumbing comprises a T-valve 145. The T-valve comprises a first port 150 that is threaded and a second port 155 that is threaded. The first port 150 is adapted to receive a water reservoir 140. The first port 150 has a first shutoff valve 160. The second port 155 is adapted to be connected to a pressurized water source. The second port 155 has a second shutoff valve 165. In this embodiment, the nipples 30 can be supplied with water from either the water reservoir 140 or the pressurized water source. Alternatively, the first port 150 or the second port 155 can be configured to receive a metered quantity of concentrated medicine or feed supplements. The concentrated medicine or feed supplements are diluted from water received by the other port.

Figure 7:
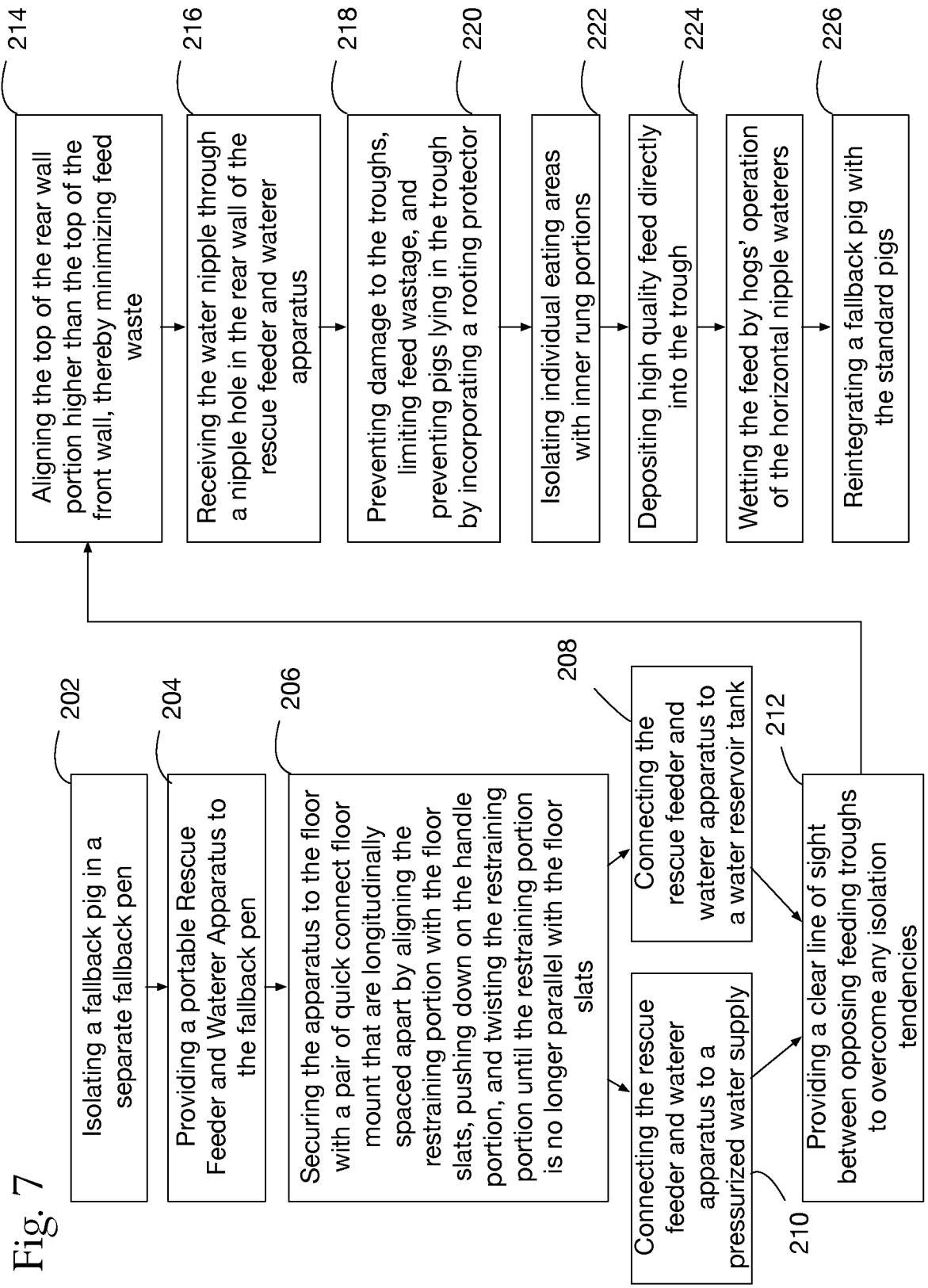
FIG. 7 shows a flow chart depicting a method for restoring a fallback animal to a main pen.

FIG. 7 shows a flow chart for reintegrating a fallback pig with the standard pigs. The fallback pig is isolated in a separate fallback pen, as shown in step 202. A portable rescue feeder and waterer apparatus is provided to the fallback pen, as shown in step 204. The apparatus is secured to the floor with a pair of quick connect floor mounts that are longitudinally spaced apart by aligning the restraining portion with the floor slats, pushing down on the handle portion, and twisting the restraining portion until the restraining portion is no longer parallel with the floor slats, as shown in step 206. The rescue feeder and waterer apparatus is connected to a water supply, such as a water reservoir tank—as shown in step 208—or to a pressurized water supply—as shown in step 210. A clear line of sight between opposing feeding troughs overcome any isolation tendencies, as shown in step 212. The top of the rear wall portion is aligned higher than the top of the front wall, thereby minimizing feed waste, as shown in step 214. The water nipples are received through a nipple hole in the rear wall of the rescue feeder and waterer apparatus, as shown in step 216. Incorporating a rooting protector, as shown in step 218, prevents damage to the troughs. Individual eating areas are separated with inner rung portions to reduce competition from an adjacent fallback pig, as shown in step 220. The producer deposits high quality feed directly into the trough, as shown in step 222. The feed is wetted by the pigs' natural operation of the horizontal nipple waterers, as shown in step 224. After restoring the fallback pig to health and proper socialization, the fall back pig is reintegrated with the standard pigs, as shown in step 226.

In another embodiment, the feeder and waterer can be used to transition weaned pigs to prevent them from becoming fallback pigs. Another advantage of the discrete eating areas and the clear line of sight from the first trough to the second trough is that they facilitate the growth and development of the weaned pig in a socialized setting. The pigs learn to stand at the trough and eat without excessive competition. Another advantage is the feed used with weaned pigs is more expensive, and the raised rear wall prevents feed from being wasted. Another advantage of this technology with weaned pigs is that the feed is made more palatable when wet. And, as discussed above, the natural operation of the waterers disposed above the feed trough allows the pigs to self-wet their feed. Another advantage to implementing this technology with a weaned pig is that the weaned pig is accustomed to a liquid diet, and the feeder and waterer provides ample water supply through the various nipple waterers. The feed is also wetted through operation of the nipple waterers. This assists in the transition from the full liquid diet of a nursing pig to the dry diet of a weaned pig. Other advantages seen using the technology with fallback pigs may also be applicable to weaned pigs. The method discussed above for fallback pigs can also be used for weaned pigs.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

It should be appreciated that any patent, publication, or other disclosure material, in whole or in part, that is to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is the to be incorporated by reference herein, but which conflicts with existing definitions, statements, or other disclosure material set forth herein, will only be incorporated to the extent that no conflict arises between that incorporated material and the existing disclosure material.

I claim:

1. A feeder and waterer apparatus for pigs, the apparatus comprising:
   a. a fluid supply line comprising:
      i. a horizontal portion having a first side and a second side;
      ii. a vertical portion;
   b. a first trough having a semi-cylindrical shape, the first trough mounted to the first side of the horizontal portion of the fluid supply line, the first trough comprising:
      i. a first pair of longitudinally extending bars;
      ii. a first plurality of rung portions mounted to the first pair of longitudinally extending bars and configured to divide the first trough into a first plurality of eating areas;
      iii. a first front wall portion;
      iv. a first rear wall portion;
      v. a first plurality of nipple ports disposed in the first rear wall portion and longitudinally spaced-apart;
   c. a second trough having a semi-cylindrical shape, the second trough mounted to the second side of the horizontal portion of the fluid supply line, the second trough comprising:
      i. a second pair of longitudinally extending bars;
      ii. a second plurality of rung portions mounted to the second pair of longitudinally extending bars and configured to divide the second trough into a second plurality of eating areas;
      iii. a second front wall portion;
      iv. a second rear wall portion;
      v. a second plurality of nipple ports disposed in the second rear wall portion and longitudinally spaced-apart;
   d. a quick-connect floor mount is rotatably mounted to the horizontal portion of the fluid supply line, the quick-connect floor mount comprising:
      i. a shaft;
      ii. a handle portion that extends horizontally from an upper portion of the shaft; and
      iii. a retaining portion that extends horizontally from a lower portion of the shaft.

2. The apparatus of claim 1, wherein each of the first plurality of nipple ports is disposed between a respective pair of the first plurality of rung portions.

3. The apparatus of claim 1, wherein:
   a. a first plurality of nipples extend horizontally through the first rear wall portion; and
   b. a second plurality of nipples extend horizontally through the second rear wall portion.

4. The apparatus of claim 3, further comprising:
   a. a fluid reservoir mounted to the vertical portion of the fluid supply line at an elevated position above the first trough and the second trough.

5. The apparatus of claim 1, wherein the quick-connect floor mount further comprises:
   a. a spring configured to push the shaft upward from the fluid supply line.

6. The apparatus of claim 1, wherein the apparatus is configured to provide an unobstructed line-of-sight for a first pig positioned at the first trough and a second pig positioned at the second trough.

7. A hopperless rescue feeder and waterer apparatus for fallback pigs, the apparatus comprising:
   a. a frame structure comprising:
      i. a first rooting protector having a ladder-like structure;
      ii. a second rooting protector having the ladder-like structure;
   b. a first semi-cylindrical trough mounted to the first rooting protector;
   c. a second semi-cylindrical trough mounted to the second rooting protector;
   d. wherein each trough has a front wall portion and a rear wall portion;
   e. a plurality of longitudinally spaced-apart nipple ports are disposed in the rear wall portion;
   f. a plurality of quick-connect floor mounts are mounted to the frame structure and are longitudinally spaced apart, each of the plurality of quick-connect floor mounts comprising:
      i. a shaft; and
      ii. a handle portion that extends horizontally from an upper portion of the shaft;
      iii. a retaining portion that extends horizontally from a lower portion of the shaft; and
   g. wherein there is a clear line-of-sight between the first semi-cylindrical trough and the second semi-cylindrical trough.

8. A method for reintegrating a fallback pig with standard pigs in a pig facility having a floor with floor slats, the method comprising the steps of:
   a. providing a rescue feeder and waterer apparatus in a separate fallback pen, the rescue feeder having a first trough that is parallel with a second trough;
   b. connecting the rescue feeder and waterer to a water supply;
   c. providing a clear line of sight between the first trough and the second trough;

d. aligning the first trough and the second trough such that for each trough a front wall is lower than a rear wall;
e. receiving a plurality of water nipples horizontally through a plurality of longitudinally spaced-apart nipple holes in the rear wall of the first trough and the second trough;
f. depositing feed directly into the first trough and the second trough;
g. wetting the feed by a pig's operation of the nipple waterers;
h. reintegrating the fallback pig with the standard pigs; and
i. securing the rescue feeder and waterer apparatus to the floor with a pair of quick connect floor mount that are longitudinally spaced apart by:
  i. aligning a restraining portion with the floor slats;
  ii. pushing down on a handle portion; and
  iii. twisting the restraining portion until the restraining portion is no longer parallel with the floor slats.

9. The method of claim 8, the method further comprising the step of:
  a. isolating individual eating areas with inner rung portions.

10. The method of claim 8 further comprising the step of:
  a. incorporating a rooting protector having a ladder-like structure to the first trough.

11. A feeder and waterer apparatus for pigs, the apparatus comprising:
  a. a frame comprising:
    i. a vertical portion that extends vertically;
    ii. a first mount connected to the vertical portion;
    iii. a second mount connected to the vertical portion and horizontally spaced apart from the first mount;
    iv. wherein each of the first mount and the second mount is a J-shaped bar configured to be removably installed in cooperation with the floor of a pen;
  b. a trough that is semi-cylindrical, the trough comprising:
    i. a back wall extending along a longitudinal axis of the trough;
    ii. a front wall extending along the longitudinal axis of the trough;
    iii. wherein the trough is mounted to the frame such the back wall is higher than the front wall;
  c. a fluid reservoir is mounted to the frame above the trough;
  d. a nipple mounted to the back wall and extending from the back wall horizontally toward the front wall; and
  e. a fluid supply line operably connecting the fluid reservoir with the nipple.

12. The apparatus of claim 11, further comprising:
  a. a rooting bar mounted to a top edge of each of the back wall, the front wall, a first side wall, and a second side wall.

* * * * *